(12) United States Patent
Liu et al.

(10) Patent No.: US 10,657,022 B2
(45) Date of Patent: May 19, 2020

(54) INPUT AND OUTPUT RECORDING DEVICE AND METHOD, CPU AND DATA READ AND WRITE OPERATION METHOD THEREOF

(71) Applicant: TSINGHUA UNIVERSITY, Beijing (CN)

(72) Inventors: Leibo Liu, Beijing (CN); Ao Luo, Beijing (CN); Shaojun Wei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/895,686

(22) Filed: Feb. 13, 2018

(65) Prior Publication Data
US 2018/0239686 A1 Aug. 23, 2018

(30) Foreign Application Priority Data

Feb. 20, 2017 (CN) .......................... 2017 1 0089783
Apr. 1, 2017 (CN) .......................... 2017 1 0212740

(51) Int. Cl.
*G06F 11/34* (2006.01)
*G06F 21/71* (2013.01)
*G06F 21/56* (2013.01)

(52) U.S. Cl.
CPC ........ *G06F 11/3485* (2013.01); *G06F 11/348* (2013.01); *G06F 11/349* (2013.01);
(Continued)

(58) Field of Classification Search
CPC .... H04L 47/10; G06F 11/348; G06F 11/3485; G06F 11/30–3089; G06F 13/385; G06F 13/28
(Continued)

(56) References Cited

U.S. PATENT DOCUMENTS 6,470,376 B1 10/2002 Tanaka et al.
6,751,751 B1 * 6/2004 Murray ................. G06F 11/364
710/15
(Continued)

FOREIGN PATENT DOCUMENTS

CN 1862518 11/2006
CN 101587552 11/2009
(Continued)

OTHER PUBLICATIONS

Zhang et al., "DeTrust: Defeating Hardware Trust Verification with Stealthy Implicitly-Triggered Hardware Trojans", Proceedings of the 2014 ACM SIGSAC Conference on Computer and Communications Security, ACM, 2014, pp. 153-166.
(Continued)

*Primary Examiner* — Brian T Misiura
(74) *Attorney, Agent, or Firm* — Hamre, Schumann, Mueller & Larson, P.C.

(57) ABSTRACT

The disclosure provides an input and output recording device and method, CPU and data read and write operation method thereof. The input and output recording device is provided between a central processor CPU and a peripheral, and is configured to record data read and write operations between the CPU and the peripheral, wherein the data read and write operations comprise a data read and write operation initiated by the peripheral and a data read and write operation initiated by the CPU; the input and output recording device is further configured to request the CPU to process the data read and write operation initiated by the peripheral, and upon receiving an instruction sent by the CPU, send a data packet of the data read and write operation initiated by the peripheral to the CPU. The disclosure can accurately record the data read and write operation between the CPU and the peripheral, so as to eliminate the influence of uncertainty caused by the asynchronous data read and
(Continued)

write operations initiated by the peripherals, and provide a basis for the input and output security checking of the CPU.

12 Claims, 4 Drawing Sheets

(52) U.S. Cl.
CPC ........ *G06F 11/3476* (2013.01); *G06F 21/566* (2013.01); *G06F 21/71* (2013.01)

(58) Field of Classification Search
USPC .............................................. 710/15, 18, 29
See application file for complete search history.

(56) References Cited

U.S. PATENT DOCUMENTS

| | | | |
|---|---|---|---|
| 6,757,831 B1 | 6/2004 | Folmsbee | |
| 7,188,219 B2* | 3/2007 | Jeddeloh | G06F 13/1642 710/310 |
| 7,373,521 B1 | 5/2008 | Kawahara | |
| 7,664,937 B2 | 2/2010 | Jacob et al. | |
| 7,941,569 B2* | 5/2011 | Parthasarathy | G06F 11/3485 710/33 |
| 8,336,767 B1 | 12/2012 | Graef et al. | |
| 8,533,834 B1 | 9/2013 | Wong et al. | |
| 8,713,370 B2* | 4/2014 | Millet | G06F 11/3636 714/27 |
| 8,996,817 B2* | 3/2015 | Bushen | G06F 13/1673 710/18 |
| 9,069,953 B2 | 6/2015 | Bellocchio et al. | |
| 9,268,959 B2 | 2/2016 | Paczkowski et al. | |
| 9,275,238 B2 | 3/2016 | Wang | |
| 9,747,446 B1 | 8/2017 | Pidathala et al. | |
| 9,830,269 B2* | 11/2017 | McKean | G06F 12/0806 |
| 9,940,460 B1* | 4/2018 | Derbeko | G06F 11/1458 |
| 10,078,459 B1* | 9/2018 | Natanzon | G06F 3/0619 |
| 2005/0229164 A1 | 10/2005 | Giraud | |
| 2006/0090209 A1 | 4/2006 | Garay et al. | |
| 2009/0292827 A1 | 11/2009 | Shiga et al. | |
| 2009/0307770 A1 | 12/2009 | Harris et al. | |
| 2010/0017605 A1 | 1/2010 | Chieze et al. | |
| 2010/0083387 A1 | 4/2010 | Rodgers et al. | |
| 2010/0192194 A1 | 7/2010 | Tan et al. | |
| 2012/0054379 A1 | 3/2012 | Leung et al. | |
| 2012/0131387 A1 | 5/2012 | Salloum et al. | |
| 2013/0238904 A1 | 9/2013 | Salgado et al. | |
| 2014/0101373 A1 | 4/2014 | Lee et al. | |
| 2014/0372738 A1 | 12/2014 | Mersh | |
| 2014/0380474 A1 | 12/2014 | Paithane et al. | |
| 2015/0020211 A1 | 1/2015 | Lai et al. | |
| 2016/0042179 A1 | 2/2016 | Wengarten et al. | |
| 2016/0098558 A1 | 4/2016 | Vedula et al. | |
| 2016/0098565 A1 | 4/2016 | Vedula et al. | |
| 2016/0275289 A1 | 9/2016 | Sethumadhavan et al. | |
| 2016/0357660 A1 | 12/2016 | Dean et al. | |
| 2016/0357966 A1 | 12/2016 | Porat et al. | |
| 2017/0052868 A1* | 2/2017 | Robertson | G06F 11/349 |
| 2017/0228562 A1 | 8/2017 | Guilley et al. | |
| 2017/0235961 A1 | 8/2017 | August et al. | |
| 2017/0286670 A1 | 10/2017 | Artman et al. | |
| 2017/0310688 A1 | 10/2017 | Lecomte et al. | |
| 2017/0315818 A1 | 11/2017 | Shivanna et al. | |
| 2017/0329966 A1 | 11/2017 | Kaganti et al. | |
| 2018/0032726 A1 | 2/2018 | Parinov et al. | |
| 2018/0032760 A1 | 2/2018 | Hu et al. | |
| 2018/0089099 A1 | 3/2018 | Raj et al. | |
| 2018/0239905 A1 | 8/2018 | Liu et al. | |

FOREIGN PATENT DOCUMENTS

| | | |
|---|---|---|
| CN | 101866328 | 10/2010 |
| CN | 103440462 | 12/2013 |
| CN | 104239616 | 12/2014 |
| CN | 104866766 | 8/2015 |
| CN | 105700999 | 6/2016 |
| CN | 108345787 | 7/2018 |
| GB | 1282628 | 7/1972 |

OTHER PUBLICATIONS

Ngo et al., "Hardware Property Checker for Run-Time Hardware Trojan Detection", 2015 European Conference on Circuit Theory and Design (ECCTD), 2015, 4 pages.

U.S. Office Action, issued in the corresponding U.S. Appl. No. 15/895,992, dated Jun. 28, 2019, 40 pages.

U.S. Office Action, issued in the corresponding U.S. Appl. No. 15/894,042, dated Jul. 8, 2019, 27 pages.

Second Chinese Office Action, issued in the corresponding Chinese Patent Application No. 201710212740.5, dated Nov. 19, 2018, 19 pages.

Chinese Office Action, issued in the corresponding Chinese Patent Application No. 201710212740.5, dated Aug. 24, 2018, 19 pages.

Chinese Office Action, issued in the corresponding Chinese Patent Application No. 201710089783.9, dated Aug. 23, 2018, 22 pages.

U.S. Final Office Action, issued in the corresponding U.S. Appl. No. 15/895,992, dated Oct. 22, 2019, 39 pages.

U.S. Office Action, issued in the corresponding U.S. Appl. No. 15/895,977, dated Dec. 4, 2019, 21 pages.

U.S. Advisory Action, issued in the corresponding U.S. Appl. No. 15/895,992, dated Jan. 31, 2020, 3 pages.

* cited by examiner

INPUT AND OUTPUT RECORDING DEVICE AND METHOD, CPU AND DATA READ AND WRITE OPERATION METHOD THEREOF

CROSS-REFERENCE TO RELATED APPLICATION(S)

This application claims priority to a Chinese Patent Application No. 201710089783.9, filed with the Chinese Patent Office on Feb. 20, 2017 and entitled "checking method, checking device and system for determining security of a processor" and a Chinese Patent Application No. 201710212740.5 filed with the Chinese Patent Office on Apr. 1, 2017 and entitled "input and output recording device and method, CPU and data read and write operation method thereof", which is incorporated herein by reference entirely.

TECHNICAL FIELD

The present disclosure relates to the field of computer technology, and more particularly, to an input and output recording device and method, a CPU and data read and write operation method thereof.

BACKGROUND

This section is intended to provide a background or context for embodiments of the present disclosure as set forth in the claims. The description herein is not admitted to be prior art by inclusion in this section.

With the large-scale application of new technologies such as network informatization, information security has become an increasingly serious problem. Usually information security we discuss is limited to network security, software security and so on, but recent studies have shown that hardware security should also be of concern.

Hardware design scale is increasing with a hardware design level, making hardware Trojans possible: factors such as current diversified sources of hardware IP (Intellectual Property) used in large-scale circuits represented by CPU (Central Processing Unit), complication of a hardware design process, refined division of the design and manufacturing process and the like result in a decrease in security controllability of hardware final products. The possibility of being implanted with malicious Trojans or loopholes (hereinafter simply referred to as Trojans) when designing increases, and an increase in hardware scale also increases the difficulty in identifying and discovering Trojans. In recent years, with the development of information security concept, hardware security has become a research hotspot of information security.

SUMMARY

The inventor found that it is possible to check CPU hardware security by taking advantage of the data read and write operations between the CPU and the peripherals. Thus, an embodiment of this disclosure is to provide an input and output recording device for achieving the function of recording data read and write operations between the CPU and the peripherals, in order to facilitate checking of CPU hardware security.

In an embodiment of the disclosure, the input and output recording device is provided between a central processor CPU and a peripheral, and is configured to record data read and write operations between the CPU and the peripheral, the data read and write operations comprising a data read and write operation initiated by the peripheral and a data read and write operation initiated by the CPU; wherein the input and output recording device is further configured to request the CPU to process the data read and write operation initiated by the peripheral, and upon receiving an instruction sent by the CPU, send a data packet of the data read and write operation initiated by the peripheral to the CPU.

In an embodiment of the disclosure, there is also provided an input and output recording method, comprising: recording data read and write operations between the CPU and the peripheral, the data read and write operations comprising a data read and write operation initiated by the peripheral and a data read and write operation initiated by the CPU; and requesting the CPU to process the data read and write operation initiated by the peripheral, and upon receiving an instruction sent by the CPU, send a data packet of the data read and write operation initiated by the peripheral to the CPU.

In an embodiment of the disclosure, there is also provided a central processor, comprising: a request processing module configured to suspend execution of current instruction stream upon receiving a request sent by an input and output recording device; an instruction sending module configured to send an instruction to the input and output recording device to instruct the input and output recording device to send a data packet of data read and write operations to be processed; and a data processing module configured to receive the data packet of the data read and write operation to be processed which is sent by the input and output recording device, and complete the data read and write operation to be processed.

In an embodiment of the disclosure, there is also provided a data read and write operation method of a central processor, comprising: suspending execution of current instruction stream upon receiving a request sent by an input and output recording device; sending an instruction to the input and output recording device to instruct the input and output recording device to send a data packet of data read and write operation to be processed; and receiving the data packet of the data read and write operation to be processed which is sent by the input and output recording device, and complete the data read and write operation to be processed.

In embodiments of the disclosure, the input and output recording device is provided between the CPU and the peripheral, and is configured to record data read and write operations between the CPU and the peripheral, including a data read and write operation initiated by the peripheral and a data read and write operation initiated by the CPU. Thus, the data read and write operations between the CPU and the peripheral can be accurately recorded, in order to facilitate the use of the recorded data read and write operations between the CPU and the peripheral in the subsequent for checking CPU hardware security. Furthermore, the input and output recording device is further configured to request the CPU to process the data read and write operations initiated by the peripheral, and upon receiving an instruction sent by the CPU, send a data packet of the data read and write operation initiated by the peripheral to the CPU. Thus, the influences of uncertainty caused by the asynchronous data read and write operation initiated by the peripherals can be eliminated, thereby providing a basis for the input and output security checking of the CPU.

In embodiments of the disclosure, the central processor may suspend execution of current instruction stream upon receiving a request sent by the input and output recording device, and send an instruction to the input and output recording device to instruct the input and output recording device to send the data packet of the data read and write operations to be processed. Then, the central processor may receive the data packet of the data read and write operations to be processed which is sent by the input and output recording device, and complete the data read and write operations to be processed. Thus, the influences of uncertainty caused by the asynchronous data read and write operations initiated by the peripherals can be eliminated, thereby providing a basis for the input and output security checking of the CPU.

BRIEF DESCRIPTION OF DRAWINGS

In order to more clearly illustrate technical solutions in embodiments of the disclosure, the attached drawings, which are to be used in the descriptions of the embodiments will be briefly described below. It is apparent that the attached drawings in the following description are merely examples of the disclosure, and other drawings may be obtained by those skilled in the art based on these drawings without creative efforts. In the drawings.

DESCRIPTION OF EMBODIMENTS

In order to enable the objectives, technical solutions, and advantages of the embodiments of the present disclosure to be clearer, the embodiments of the disclosure are further described in detail below with reference to the accompanying drawings. Here, the exemplary embodiments of the disclosure and the descriptions thereof are used to explain the disclosure, but are not intended to limit the disclosure.

Hardware security is a foundation of software security. All implementations of software security are based on an assumption that hardware is trusted, i.e., the hardware should work according to behavior defined by its manual. Currently in most cases performance checking for hardware is carried out when designing or leaving the factory. As hardware appears in the form of a black box in a user's system after leaving the factory (unlike software Trojan, code of which is present in a system, and can be read and analyzed), hardware behavior cannot be monitored or perceived. In addition, due to the difficulty in determining the reasonability of the hardware behavior, there is no research on hardware security.

Figure 1:
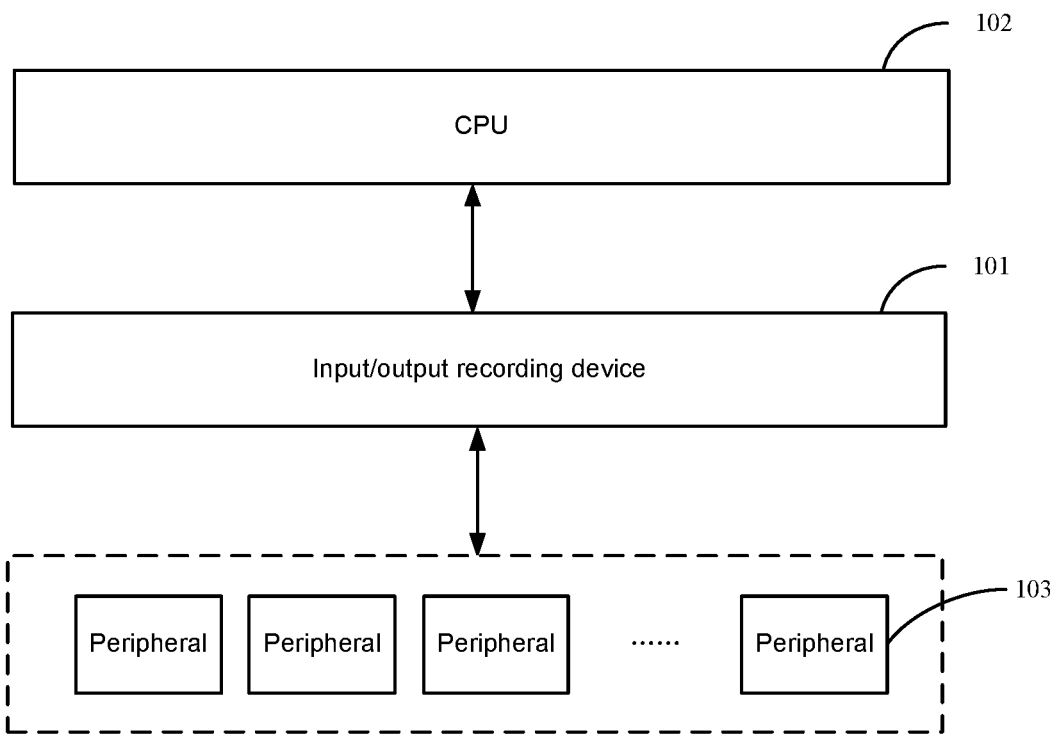
FIG. 1 is a schematic diagram of an input and output recording device in accordance with an embodiment of the disclosure.

An input and output recording device proposed by the disclosure can accurately record data read and write operations between the CPU and peripherals, in order to use the record subsequently for the hardware security checking to solve the problem of hardware security. FIG. 1 is a schematic diagram of an input and output recording device in accordance with an embodiment of the disclosure. As illustrated in FIG. 1, the input and output recording device 101 of the embodiment of the disclosure may be provided between the CPU 102 and the peripherals 103 for recording data read and write operations between the CPU 102 and the peripherals 103. The data read and write operations may include a data read and write operation initiated by the peripherals 103 and a data read and write operation initiated by the CPU 102. The input and output recording device 101 may be further configured to request the CPU 102 to process the data read and write operation initiated by the peripherals 103 and send a data packet of the data read and write operation initiated by the peripherals 103 to the CPU 102 upon receiving an instruction sent by the CPU 102.

As described above, the input and output recording device is provided between the CPU and the peripherals. In a specific embodiment, the input and output recording device may be integrated with the CPU core. In this case, the input and output recording device being provided between the CPU and the peripherals means that the input and output recording device is provided between the CPU core and the peripherals. Of course, the input and output recording device may also be implemented as a CPU-independent chip, or may be implemented in another form of device, which is not limited in the present disclosure. For example, a part of the functions of the input and output recording device according to the embodiment of the disclosure may be integrated on the same chip with the CPU, and the remaining other functions may be implemented as independent chips, all of which should fall into the protection scope of the present disclosure.

The input and output recording device may record data read and write operations initiated by the CPU, but also record the data read and write operations initiated by peripherals. The data read and write operations initiated by the CPU may include, for example, data read and write operations such as MMIO (Memory mapped I/O), and the data read and write operations initiated by peripherals may include, for example, data read and write operations such as DMA (Direct Memory Access) and P2P (Peer to Peer). It should be understood that, in the embodiment of the disclosure, only P2P data read and write operations via the CPU are recorded, and it is not necessary to record P2P data read and write operations that do not pass through the CPU. The input and output recording device is recorded for the data read and write operations initiated by the CPU. For the data read and write operations initiated by peripherals, since they are asynchronous data read and write operations initiated by the peripherals, they may bring the impact of uncertainty, which is not beneficial to the CPU input and output security checking. In the embodiment of the disclosure, for the data read and write operations initiated by peripherals, the input and output recording device, in addition to the record, also requests the CPU to process the data read and write operations initiated by the peripherals, and then send the data packets of the data read and write operations initiated by the peripherals to the CPU upon receiving the instruction sent by the CPU. As such, the input and output recording device can cooperate with the processor and synchronize the data read and write operations asynchronous with the instructions to the instructions so as to eliminate the influence of uncertainty caused by the asynchronous data read and write operations initiated by the peripherals, and provide a basis for the input and output security checking of the CPU.

In a specific implementation, the input and output recording device may store the data packets of the data read and write operations initiated by the peripherals after receiving the data packets of the data read and write operations initiated by the peripherals and request the CPU to process the data read and write operations initiated by the peripherals. The input and output recording device may request the CPU to process the data read and write operations initiated by the peripherals when the stored data packets of the data read and write operations initiated by the peripherals reach a preset threshold. Of course, this is only an example. Other conditions or timing for initiating a request to the CPU by the input and output recording apparatus may also be set according to actual requirements, which is not limited in the present disclosure. For example, the input and output recording device may also initiate a request to the CPU each time a data packet of a data read and write operation initiated by the peripherals is received and stored. All these variations should fall into the protection scope of the present disclosure. Compared with the solution of initiating a request to the CPU each time a data packet of a data read and write operation initiated by the peripherals is received and stored, initiating a request to the CPU when the stored data packet of the data read and write operations initiated by the peripherals reaches a preset threshold can avoid overburdening the CPU by frequent requests, speeding up the CPU's response speed.

In a specific implementation, the input and output recording device may use a variety of ways to request the CPU to process the data read and write operations initiated by the peripherals. For example, the input and output recording device may send a notification message to the CPU, requesting the CPU to process the data read and write operations initiated by the peripherals through the notification message. Of course, requesting the CPU to process the data read and write operation initiated by the peripherals in the form of a notification message is only one example. Those skilled in the art can derive some variations therefrom, and these variations should all fall into the protection scope of the present disclosure. For example, the input and output recording device may use an interrupt mode to request CPU to process the data read and write operation initiated by the peripherals. After receiving the data read and write operation initiated by the peripherals, the input and output recording device may temporarily store the data packet of the data read and write operation initiated by the peripherals and send an interrupt request to the CPU to request the CPU to process the data read and write operation initiated by the peripherals. After receiving the interrupt request, the CPU may suspend execution of the current instruction stream, record the current instruction position and the data read and write operation initiated by the peripherals to be processed, and send an instruction to the input and output recording device. It should be understood that, the embodiment of the disclosure does not limit the order in which the above actions are performed. The input and output recording device may send the data packet of the data read and write operation initiated by the peripherals to the CPU after receiving the instruction from the CPU. And the CPU may resume execution of the instruction stream according to the recorded current instruction position after completing the data read and write operation initiated by the peripherals.

The input and output recording device can record all the data read and write operations between the CPU and the peripherals. Of course, in other embodiments, the input and output recording device can also selectively record only a part of the data read and write operations between the CPU and the peripherals. As to which part of the data read and write operations between the CPU and the peripherals is to be selected for recording, the input and output recording device may preset some conditions or rules or may randomly select to record, which is not limited in the present disclosure. As an example, the input and output recording device may be preset to only record data read and write operations between the CPU and some peripherals. In this case, when the CPU or peripheral initiates a data read and write operation, the input and output recording device may obtain an identification (ID) of the peripheral involved in the data read and write operation, and determine whether to record the data read and write operation according to the ID of the peripheral. In particular, it can check whether the obtained peripheral ID is a preset peripheral ID. The preset peripheral ID corresponds to the peripheral for which the data read and write operation with the CPU needs to be recorded. If yes, it is determined that the data read and write operation between the CPU and the peripheral needs to be recorded.

For the data read and write operation initiated by the CPU and the data read and write operation initiated by the peripherals, the input and output recording device will use different processing manners, and thus after receiving the data packet of the data read and write operation between the CPU and the peripherals, the input and output recording device needs to judge whether it is the data read and write operation initiated by the CPU or the data read and write operation initiated by the peripherals. There are many specific ways to judge, which is not limited in the present disclosure. For example, a transaction identification may be set in the data packet of the data read and write operation between the CPU and the peripherals, and the transaction identification may be used to identify the initiator of the data read and write operation. The input and output recording device may obtain the transaction identification of the data packet of the data read and write operation between the CPU and the peripherals, and determine whether the data read and write operation between the CPU and the peripherals is the data read and write operation initiated by the peripherals according to the transaction identification. Those skilled in the art can derive some variations therefrom accordingly, and all these variations should fall into the protection scope of the present disclosure. As described above, after determining that the data read and write operation between the CPU and the peripherals is the data read and write operation initiated by the peripherals, the input and output recording device may request the CPU to process the data read and write operation initiated by the peripherals, and upon receiving the instruction sent by the CPU, send the data packet of the data read and write operation initiated by the peripherals to the CPU in order to eliminate the impact of the uncertainty caused by the asynchronous data read and write operation initiated by the peripherals.

Figure 2:
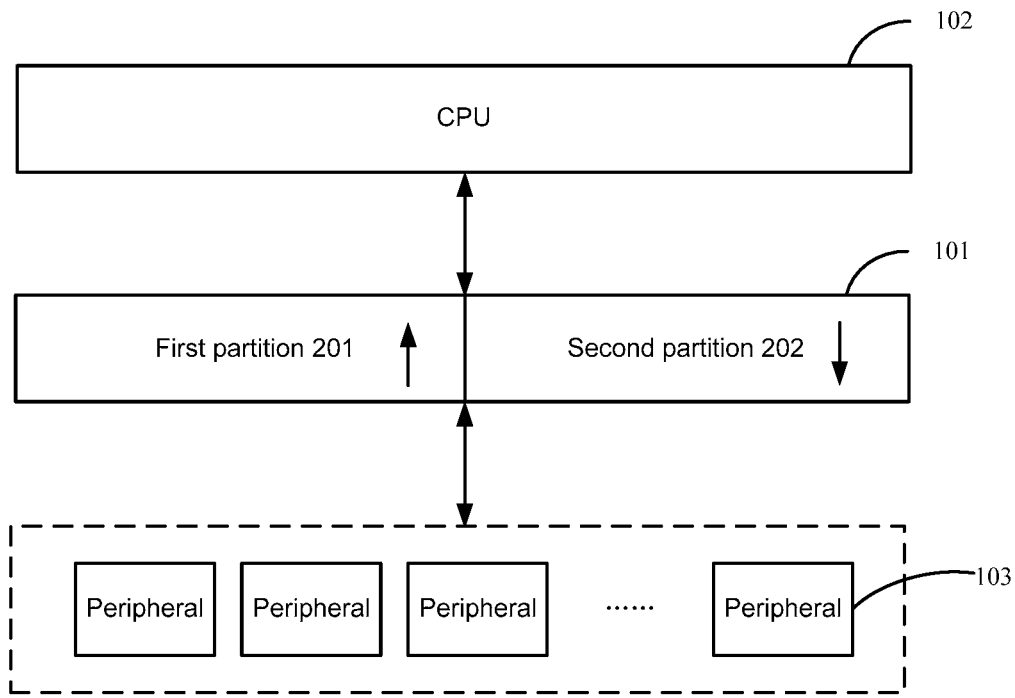
FIG. 2 is a specific example diagram in which the input and output recording device includes a first partition and a second partition in accordance with an embodiment of the disclosure.

In a specific embodiment, in order for the input and output recording device to look for the stored data packet of the data read and write operation between the CPU and the peripherals, as illustrated in FIG. 2, the input and output recording device 101 may include a first partition 201 for recording data packets flowing from the peripherals to the CPU and a second partition 202 for recording data packets flowing from the CPU to the peripherals. In FIG. 2, an upward arrow in the first partition 201 indicates that data packets flow from the peripherals to the CPU and a downward arrow in the second partition 202 indicates that data packets flow from the CPU to the peripherals.

Further, the inventors consider that if data packets of the data read and write operations between the CPU and the peripherals are separately recorded in the first partition and the second partition according to the flow direction of the data packets, due to the asynchronism of the data read and write operations initiated by the peripherals, and other possible useless data packets (e.g., miscellaneous items such as system information), the data information recorded in the first partition and the second partition may be mixed and the retrieval complexity will increase, making it difficult to efficiently obtain the required information entries. Thus, in order to improve data retrieval efficiency, in a specific embodiment, the input and output recording device may record and organize the recorded data packets according to the type of the read and write operation. In particular, the recorded data packets flowing from the peripherals to the CPU may be organized in the first partition according to the type of the data read and write operation, and the recorded data packets flowing from the CPU to the peripherals may be organized in the second partition according to the type of the data read and write operation, so as to improve data retrieval efficiency.

Figure 3:
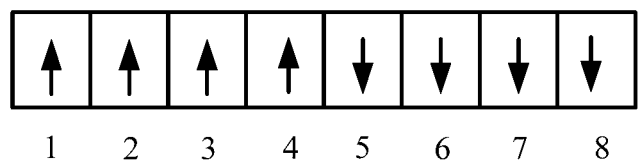
FIG. 3 is a specific example diagram of organizing the recorded data packets at the first partition and the second partition in accordance with an embodiment of the disclosure.

FIG. 3 is a specific example diagram of organizing the recorded data packets at the first partition and the second partition in accordance with an embodiment of the disclosure. As illustrated in FIG. 3, in the present example, each of the first partition and the second partition may include 4 sub-regions. In particular, the first partition may include a first sub-region for recording data packets flowing from the peripherals to the CPU of MMIO type, which is indicated by the numeral 1 in FIG. 3; a second sub-region for recording data packets flowing from the peripherals to the CPU of DMA type, which is indicated by the numeral 2 in FIG. 3; a third sub-region for recording data packets flowing from the peripherals to the CPU of P2P type, which is indicated by the numeral 3 in FIG. 3; and a fourth sub-region for recording other type of data packets flowing from the peripherals to the CPU except for the MMIO type, the DMA type and the P2P type, which is indicated by the numeral 4 in FIG. 3. The second partition may include a fifth sub-region for recording data packets flowing from the CPU to the peripherals of MMIO type, which is indicated by the numeral 5 in FIG. 3; a sixth sub-region for recording data packets flowing from the CPU to the peripherals of DMA type, which is indicated by the numeral 6 in FIG. 3; a seventh sub-region for recording data packets flowing from the CPU to the peripherals of P2P type, which is indicated by the numeral 7 in FIG. 3; and an eighth sub-region for recording other type of data packets flowing from the CPU to the peripherals except for the MMIO type, the DMA type and the P2P type, which is indicated by the numeral 8 in FIG. 3.

The other type of data packets flowing from the peripherals to the CPU except for the MMIO type, the DMA type and the P2P type and the other type of data packets flowing from the CPU to the peripherals except for the MMIO type, the DMA type and the P2P type as described above may be recorded as Misc, e.g., may include miscellaneous items such as system information. It should be understood that the above division from the first sub-region to the eighth sub-region is logical and does not require division on the physical address. It should also be understood that the present disclosure does not limit the order between the data packet storage sub-regions of the MMIO, DMA, P2P, and Misc types. For example, the other type of data packets flowing from the peripherals to the CPU except for the MMIO type, the DMA type and the P2P type may be recorded in the first sub-region. The first partition and the second partition respectively organize data according to the type of the read and write operation, so that corresponding information can be read directly from the corresponding data structures in the first partition and the second partition when needed. Such data recording and organizing way can greatly improve the data retrieval efficiency, which in turn can improve the efficiency of the subsequent use of such recorded information for CPU security checking. It should also be understood that with the development of technology, the types of read and write operations in the processor may change, and the read and write operations that the security checking pays attention to will also change accordingly, so the data organization manner will also change accordingly. Any variations that do not depart from the spirit and purpose of the present disclosure should fall into the protection scope of the embodiments of the present disclosure.

In a specific embodiment, data packets flowing from the peripherals to the CPU may be sequentially recorded in the first partition in order of time, and data packets flowing from the CPU to the peripherals may be sequentially recorded in the second partition in order of time. Recording data packets in order of time can facilitate future search and further improve data retrieval efficiency. It can be understood that recording the data packets in order of time is also a specific example. Those skilled in the art may derive other variations therefrom. For example, other data packet recording sequences or rules may be set, which should also equally fall into the protection scope of the present disclosure.

Figure 4:
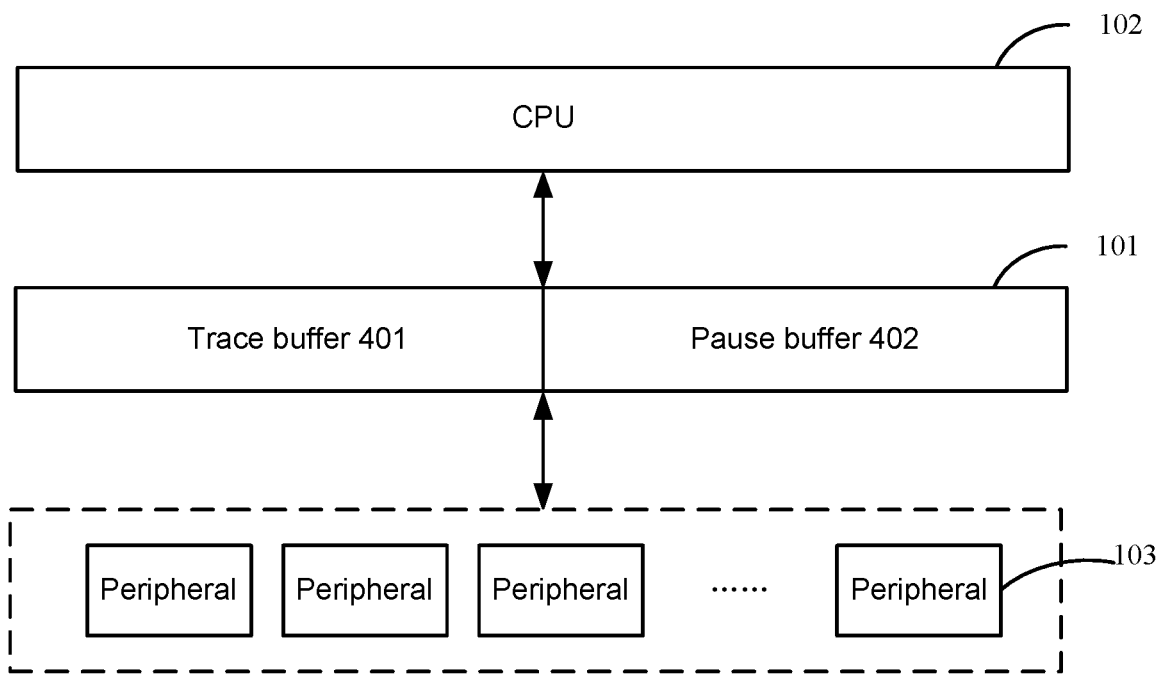
FIG. 4 is a specific example diagram in which the input and output recording device includes a trace buffer and a pause buffer in accordance with an embodiment of the disclosure.

In a specific embodiment, it is also possible to logically divide the input and output recording device so that its different functions can be efficiently executed. For example, in the example illustrated in FIG. 4, the input and output recording device 101 may include a trace buffer 401 and a pause buffer 402. The trace buffer 401 may be used to record data read and write operations between the CPU 102 and the peripherals 103. The data read and write operations may include data read and write operations initiated by the peripherals 103 and data read and write operations initiated by the CPU 102. The pause buffer 402 may be used to request the CPU 102 to process the data read and write operations initiated by the peripherals 103, and upon receiving the instruction sent by the CPU 102, send the buffered data packets of the data read and write operations initiated by the peripherals 103 to the CPU 102 through the trace buffer 401, so that the trace buffer 401 can record the data read and write operations initiated by the peripherals 103. Alternatively, the trace buffer may record the data read and write operations initiated by the CPU, and the pause buffer may record the data read and write operations initiated by the peripherals. The pause buffer may request the CPU to process the data read and write operations initiated by the peripherals, and upon receiving the instruction sent by the CPU, send the data packets of the recorded data read and write operations initiated by the peripherals to the CPU by itself.

It can be understood that, in this embodiment, the division of functions between the trace buffer and the pause buffer to implement the input and output recording device is only a logical distinction. In the implementation, the trace buffer and the pause buffer may not be separately set in the input and output recording device. For another example, the input and output recording device may be divided into two buffers for respectively recording the data read and write operations initiated by the CPU 102 and the data read and write operations initiated by the peripheral 103. The buffers for recording the data read and write operations initiated by the peripheral 103 may also be used to temporarily store/buffer the received data packets, and then send the data packets to the CPU 102 after receiving the instruction from the CPU 102. All these changed embodiments should fall into the protection scope of the present disclosure.

Based on the same inventive concept, an embodiment of the disclosure further provides an input and output recording method, as described in the following embodiments. Since the principle of the input and output recording method to solve the problem is similar to that of the input and output recording device, the implementation of the input and output recording method may refer to the implementation of the input and output recording device, and details are not repeated herein.

Figure 5:
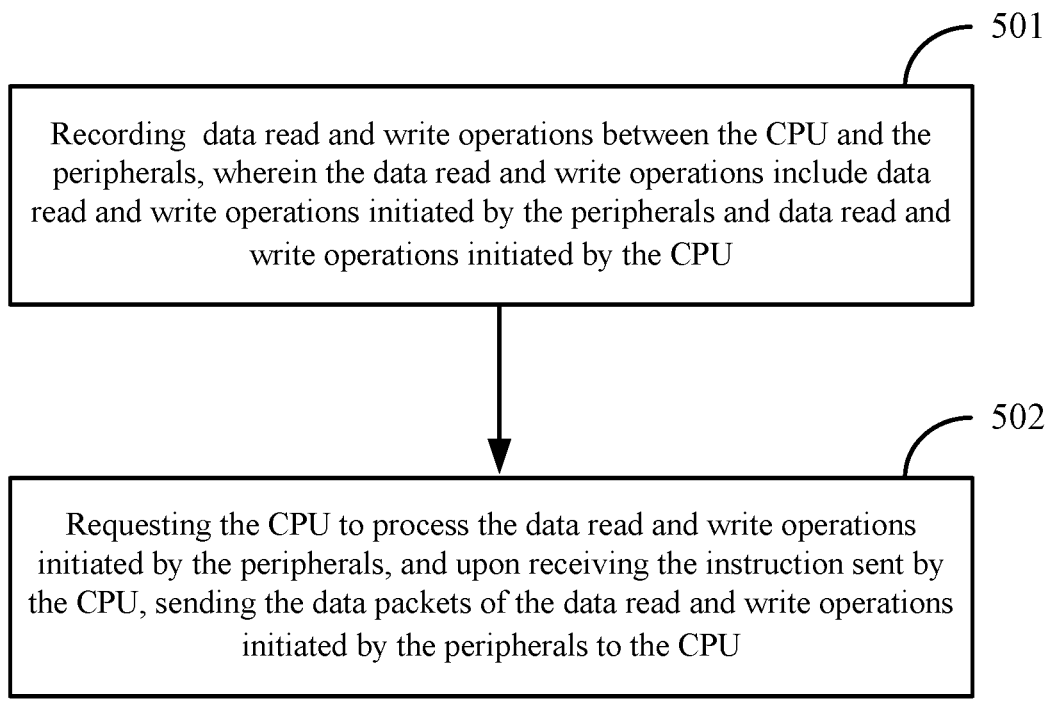
FIG. 5 is a schematic diagram of an input and output recording method in accordance with an embodiment of the disclosure.

FIG. 5 is a schematic diagram of an input and output recording method in accordance with an embodiment of the disclosure. As illustrated in FIG. 5, the method may include: Step 501, recording the data read and write operations between the CPU and the peripherals, wherein the data read and write operations may include data read and write operations initiated by the peripherals and data read and write operations initiated by the CPU; and Step 502, requesting the CPU to process the data read and write operations initiated by the peripherals, and upon receiving the instruction sent by the CPU, send the data packets of the data read and write operations initiated by the peripherals to the CPU.

It should be understood that, in specific implementation, the embodiment of the disclosure does not limit the execution sequence of step 501 and step 502. For example, for the data read and write operations initiated by the CPU, the input and output recording device may only record without doing other processing. For the data read and write operations initiated by the peripherals, it may first record the data read and write operations initiated by the peripherals, and then request the CPU to process the data read and write operations initiated by the peripherals; alternatively, it may also request the CPU to process, and then record the CPU-processed data read and write operations initiated by the peripherals. These variations should also fall into the protection scope of the present disclosure.

As described above, in a specific embodiment, the requesting the CPU to process the data read and write operations initiated by the peripherals may include requesting the CPU to process the data read and write operations initiated by the peripherals when the stored data packets of the data read and write operations initiated by the peripherals reach a preset threshold.

As described above, in a specific embodiment, the requesting the CPU to process the data read and write operations initiated by the peripherals may include requesting the CPU to process the data read and write operations initiated by the peripherals using an interrupt mode.

As described above, in a specific embodiment, the input and output recording method may further include obtaining an identification of a peripheral, and determining whether to record the data read and write operation between the CPU and the peripheral according to the identification of the peripheral.

As described above, in a specific embodiment, the input and output recording method may further include obtaining a transaction identification of the data packet of the data read and write operations between the CPU and the peripheral, and determining whether the data read and write operations between the CPU and the peripheral is the data read and write operation initiated by the peripheral according to the transaction identification.

As described above, in a specific embodiment, the recording the data read and write operations between the CPU and the peripherals may include recording data packets flowing from the peripheral to the CPU and data packets flowing from the CPU to the peripherals. The recorded data packets flowing from the peripheral to the CPU and data packets flowing from the CPU to the peripherals may be organized according to the type of the data read and write operations.

As described above, in a specific embodiment, organizing the recorded data packets flowing from the peripheral to the CPU and data packets flowing from the CPU to the peripherals according to the type of the data read and write operations may include organizing the recorded data packets flowing from the peripheral to the CPU and data packets flowing from the CPU to the peripherals in MMIO type, DMA type, P2P type and other types except for the MMIO type, the DMA type and the P2P type, respectively.

As described above, in a specific embodiment, the recording data packets flowing from the peripheral to the CPU and data packets flowing from the CPU to the peripherals may include sequentially recording data packets flowing from the peripheral to the CPU and data packets flowing from the CPU to the peripherals in order of time.

Based on the same inventive concept, an embodiment of the disclosure further provides a central processor, as described in the following embodiments. Since the principle of the central processor to solve the problem corresponds to that of the input and output recording device and the input and output recording method, the implementation of the central processor may refer to the implementation of the input and output recording device and the input and output recording method, and details are not repeated herein.

Figure 6:
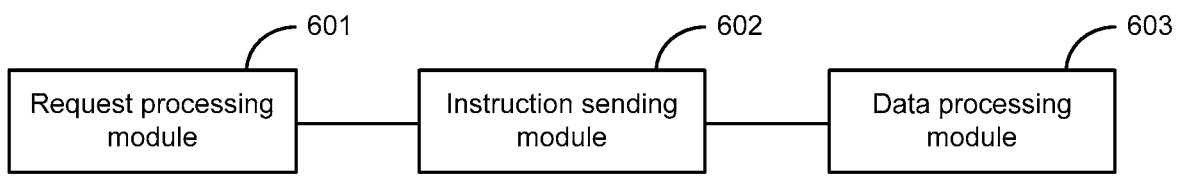
FIG. 6 is a schematic diagram of a central processor in accordance with an embodiment of the disclosure.

FIG. 6 is a schematic diagram of a central processor in accordance with an embodiment of the disclosure. As illustrated in FIG. 6, the central processor may include: a request processing module 601 for suspending execution of the current instruction stream when receiving a request sent by the input and output recording device; an instruction sending module 602 for sending an instruction to the input and output recording device to instruct the input and output recording device to send the data packets of the data read and write operation to be processed; and a data processing module 603 for receiving the data packets of the data read and write operation to be processed which are sent by the input and output recording device, and completing the data read and write operation to be processed.

It should be understood that the data read and write operation initiated by the peripheral to be processed refers to the data read and write operation initiated by the peripheral to be processed by the CPU after this suspending. For example, after receiving the interrupt request sent by the input and output recording device, the CPU may check how many data read and write operations initiated by the peripherals are temporarily stored in the current input and output recording device and select at least a part of the data read and write operations initiated by the peripherals to process (the selected part of the data read and write operations is the data read and write operation to be processed according to the present disclosure). In an embodiment, upon suspending execution of the current instruction stream, the request processing module 601 may suspend execution of the next instruction after the CPU executes the current instruction. In another embodiment, the CPU may choose to suspend execution of the instruction stream at a certain timing based on a predefined policy.

In an embodiment, the request processing module 601 may be further configured to record the current instruction position and the data read and write operation to be processed, wherein the data read and write operation is a data read and write operation initiated by the peripheral, to facilitate subsequent security checking. It should be understood that when the CPU records the current instruction position and the data read and write operation initiated by the peripheral to be processed, the CPU may choose to record in the local storage or record in the input and output recording device, which is not limited in the embodiments of the present disclosure.

For example, the CPU may send the current instruction position and the data read and write operation to be processed to the input and output recording device in the instruction information, so as to record, in the recording device, the current instruction position and the data read and write operation to be processed (or this processed data read and write operation). The CPU may use a log to record the current instruction position and the data read and write operation to be processed. Of course, the current instruction position and the data read and write operation to be processed may also be recorded in other manners, which is not limited in the present disclosure. The type of the data read and write operation to be processed (such as DMA or P2P) may be recorded in implementation, and the details of the data read and write operation to be processed may also be recorded, such as a read operation, a write operation, a read/write address, and the like. It should also be understood that the current instruction position and the data read and write operation to be processed may be recorded by the input and output recording device, and these variations should fall into the protection scope of the present disclosure.

It should also be understood that when the above data read and write operation to be processed includes a plurality of data read and write operations, the CPU may indicate the sequence of processing in the instruction information, and record the processing sequence while recording the data read and write operation to be processed. Those skilled in the art can derive some variations therefrom, and all these variations should fall into the protection scope of the present disclosure.

In an embodiment, the request processing module 601 may be further configured to record the current instruction position and the data read and write operation to be processed, wherein the data read and write operation is a data read and write operation initiated by the peripheral. For example, the request processing module 601 may suspend execution of the current instruction stream, and after recording the current instruction position and the data read and write operation to be processed, instruct the sending module to send an instruction to the input and output recording device to instruct the input and output recording device to send the data packets of the data read and write operation to be processed. As such, during the operation of the checking device, the corresponding data read and write operations can be obtained and executed according to the record, in order for the subsequent security determination.

Hereinafter, a security checking method will be described by way of example. An initial running state of a checking device is set according to initial running state information of the processor during a target running process, and input information of the processor during the target running process is taken as input information of the checking device. The checking device is caused to execute a task of the target running process in a manner conforming to predefined behavior to obtain output information and/or final running state information of the checking device, wherein the predefined behavior is a standard of hardware behavior of the processor. When the checking device completes the task of the target running process, whether or not the processor is secure during the target running process is determined, according to the output information and/or the final running state information of the checking device. When the checking device is caused to execute a task of the target running process, the corresponding data read and write operation needs to be executed according to the above recorded instruction position and the data read and write operation to be processed.

Various design considerations for security checking of a processor are further described in a U.S. application Ser. No. 15/804,188, filed on Nov. 6, 2017 and entitled "METHOD, CHECKING DEVICE, AND SYSTEM FOR DETERMINING SECURITY OF A PROCESSOR", which is incorporated herein by reference in their entirety as part of disclosure of the present application.

When the above data read and write operation to be processed includes only one data read and write operation, the instruction sending module may instruct the input and output recording device to send the data packets of the above data read and write operation to be processed. In other embodiments, when the above data read and write operation to be processed includes a plurality of data read and write operations, the instruction sending module may instruct the input and output recording device to sequentially send the data packets of the data read and write operations to be processed one by one. As such, the CPU may sequentially process the plurality of data read and write operations. It should be understood that, the embodiment of the disclosure does not limit the order of the steps performed by the request processing module 601 and the instruction sending module 602. For example, when the CPU decides to process the data read and write request initiated by the peripheral, the request processing module 601 may first record the current instruction position and the data read and write operation to be processed, and then suspend execution of the current instruction stream. Meanwhile, the instruction sending module 602 may send an instruction to the input and output recording device to instruct the input and output recording device to send the data packets of the data read and write operation to be processed.

One possible situation is that the data read and write operation to be processed includes a plurality of data read and write operations, the instruction sending module 602 may instruct the input and output recording device to send the data packets of the data read and write operation to be processed several times. For example, when the instruction sending module 602 sends an instruction for the first time, the instruction sending module 602 may instruct the input and output recording device to send data packets of some data read and write operations therein, and when sending an instruction for the second time, instruct the input and output recording device to send data packets of some of the remaining data read and write operations. As for the data packets of which data read and write operations to be sent, the input and output recording device can be notified by carrying an identification in the sent instruction. For several instructions, there are various variations for instructing the input and output recording device to send data packets of several data read and write operations in each sending instruction, which is not limited in the present disclosure.

The instruction sending module 602 may instruct the input and output recording device to send the data packets of all stored the data read and write operations initiated by the peripherals. In other embodiments, it is also possible to send an instruction to the input and output recording device in accordance with processing strategy to instruct the input and output recording device to send the data packets of the selected data read and write operation to be processed and to process other data read and write operations stored in the input and output recording device after the next interruption. The processing policy may be preset by the user, or may be selected by the CPU in real time according to the current load, which is not limited in the embodiments of the present disclosure.

After the instruction sending module 602 sends an instruction to the input and output recording device, the data processing module 603 may receive the data packet of the data read and write operation to be processed sent by the input and output recording device and complete the data read and write operation to be processed. The data packets of the data read and write operation to be processed received by the data processing module 603 may be a data packet including the data content. For example, in the case that the data read and write operation to be processed is a data write operation, the data packet may include the data content to be written. The data packets of the data read and write operation to be processed received by the data processing module may also be a data packet of a request/request-response type. For example, in the case that the data read and write operation to be processed is a data read operation, the data packet received by the data processing module may be a read request data packet, and the data packet does not include the data content.

It should be understood that, in different communication protocols, signaling processes of data read and write operations may be different. The following describes an example in which the data processing module 603 processes a data read and write operation under some signaling flow. It should be understood that the embodiments of the present disclosure are not limited thereto.

For example, data read and write operations initiated by the peripherals may include for example DMA and P2P types of data read and write operations. For a DMA type of data write operation, the data processing module 603 needs to write the data content in the data packet into the memory after receiving the data packet of the DMA type of data write operation. For a DMA type of data read operation, the data processing module may send a read request response data packet after receiving a request data packet of the DMA type of data read operation, and then read the data content from the memory and feedback the read data content to the peripheral. When the data processing module feeds back the read data content to the peripheral, the data content will be recorded by the input and output recording device.

For another example, for a P2P type of data write operation, the data processing module 603 may write the data content in the data packet into the target other peripheral after receiving the data packet of the P2P type of data write operation. For a P2P type of data read operation, after receiving the data packet of the P2P type of data read operation, the data processing module 603 may forward the read response request data packet of the target peripheral, and then read the data content from the target peripheral and feed back to the requesting peripheral. When the data processing module interacts data content with the peripheral, the data content will be recorded by the input and output recording device. For the MMIO type of data read and write operations, the signaling flow is similar to the signaling flow above. To avoid repetition, details are not described herein again. After the data processing module 603 completes the data read and write operation to be processed, the processing module may be requested to resume executing the instruction stream.

Based on the same inventive concept, an embodiment of the disclosure further provides a data read and write operation method of the central processor, as described in the following embodiments. Since the principle of the data read and write operation method of the central processor to solve the problem corresponds to that of the central processor, the implementation of the data read and write operation method of the central processor may refer to the implementation of the above central processor, and details are not repeated herein.

Figure 7:
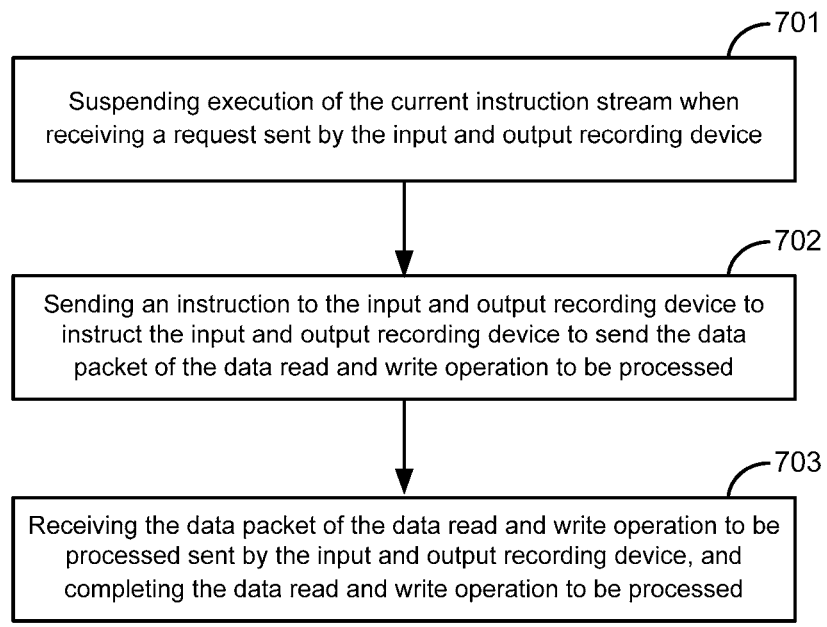
FIG. 7 is a schematic diagram of a data read and write operation method of the central processor in accordance with an embodiment of the disclosure.

FIG. 7 is a schematic diagram of a data read and write operation method of the central processor in accordance with an embodiment of the disclosure. As illustrated in FIG. 7, the method may include: Step 701, suspending execution of the current instruction stream when receiving a request sent by the input and output recording device; Step 702, sending an instruction to the input and output recording device to instruct the input and output recording device to send the data packet of the data read and write operation to be processed; and Step 703, receiving the data packet of the data read and write operation to be processed sent by the input and output recording device, and completing the data read and write operation to be processed.

As described above, in a specific embodiment, the current instruction position and the data read and write operation to be processed may also be recorded, wherein the data read and write operation is a data read and write operation initiated by the peripheral. As such, during the operation of the checking device, the corresponding data read and write operations can be obtained and executed according to the record, in order for the subsequent security determination.

As described above, in a specific embodiment, the sending an instruction to the input and output recording device to instruct the input and output recording device to send the data packet of the data read and write operation to be processed may include when the data read and write operation to be processed includes a plurality of data read and write operations, instructing the input and output recording device to sequentially send the data packets of the data read and write operations to be processed one by one.

As described above, in a specific embodiment, the sending an instruction to the input and output recording device to instruct the input and output recording device to send the data packet of the data read and write operation to be processed may include sending an instruction to the input and output recording device in accordance with processing strategy to instruct the input and output recording device to send the data packet of the selected data read and write operation to be processed.

As described above, in a specific embodiment, the data read and write operation to be processed may include for example DMA and P2P types of data read and write operations.

As described above, in a specific embodiment, the data read and write operation method of the central processor may further include resuming the execution of the instruction stream after completing the data read and write operation to be processed.

In summary, in the embodiments of the present disclosure, the input and output recording device is provided between the CPU and the peripherals for recording the data read and write operations between the CPU and the peripherals, including data read and write operations initiated by the peripherals and data read and write operations initiated by the CPU. Thus the data read and write operations between the CPU and the peripherals can be accurately recorded, in order to facilitate the CPU hardware security checking using the data read and write operations between the CPU and the peripherals in the subsequent. And the input and output recording device is further configured to request the CPU to process the data read and write operation initiated by the peripheral and send the data packet of the data read and write operation initiated by the peripheral to the CPU when receiving the instruction sent by the CPU, so as to eliminate the influence of uncertainty caused by the asynchronous data read and write operations initiated by the peripherals, and provide a basis for the input and output security checking of the CPU.

In the embodiments of the disclosure, when receiving a request sent by the input and output recording device, the CPU may suspend execution of the current instruction stream and send an instruction to the input and output recording device to instruct the input and output recording device to send the data packet of the data read and write operation to be processed. Then, the data packets of the data read and write operation to be processed sent by the input and output recording device may be received, and the data read and write operation to be processed may be completed. Thus, the influences of uncertainty caused by the asynchronous data read and write operations initiated by the peripherals can be eliminated, thereby providing a basis for the input and output security checking of the CPU.

Figure 8:
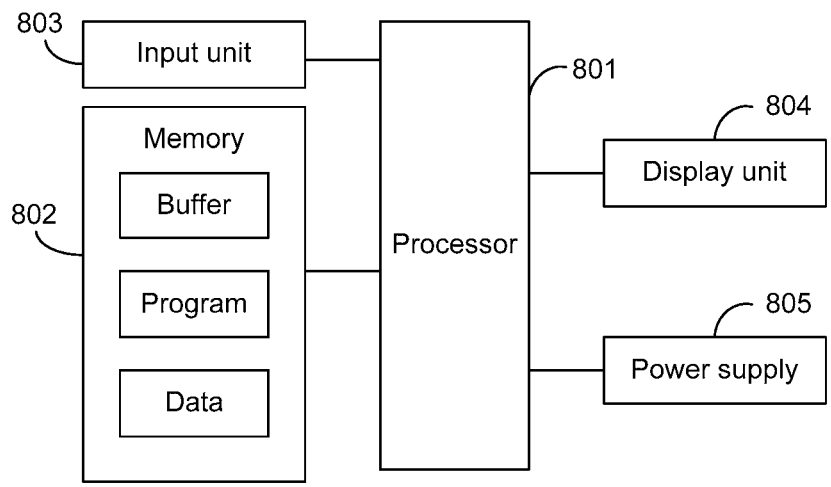
FIG. 8 is a schematic block diagram of a system configuration of an electronic device in accordance with an embodiment of the disclosure.

FIG. 8 is a schematic block diagram of a system configuration of an electronic device in accordance with an embodiment of the disclosure. As illustrated in FIG. 8, the electronic device may include a processor 801 and a memory 802 coupled to the processor 801. It is noted that the figure is exemplary and that other types of structures may also be used to supplement or substitute the structure for communication, detection, or other functions.

In an embodiment, the processor 801 may integrate the functions of the aforementioned input and output recording device. For example, the processor 801 may be configured to perform control to: record the data read and write operation between the CPU and the peripheral, wherein the data read and write operation includes data read and write operation initiated by the peripheral and data read and write operation initiated by the CPU; request the CPU to process the data read and write operation initiated by the peripheral; and upon receiving an instruction sent by the CPU, send the data packet of the data read and write operation initiated by the peripheral to the CPU.

In a specific embodiment, the requesting the CPU to process the data read and write operation initiated by the peripheral may include requesting the CPU to process the data read and write operation initiated by the peripheral when the stored data packet of the data read and write operation initiated by the peripheral reaches a preset threshold.

In a specific embodiment, the requesting the CPU to process the data read and write operation initiated by the peripheral may include requesting the CPU to process the data read and write operation initiated by the peripheral using an interrupt mode.

In a specific embodiment, the processor 801 may be further configured to perform control to: obtain an identification of the peripheral, and determine whether to record the data read and write operation between the CPU and the peripheral according to the identification of the peripheral.

In a specific embodiment, the processor 801 may be further configured to perform control to: obtain a transaction identification of the data packet of the data read and write operation between the CPU and the peripheral, and determine whether the data read and write operation between the CPU and the peripheral is the data read and write operation initiated by the peripheral according to the transaction identification.

In a specific embodiment, the recording the data read and write operation between the CPU and the peripheral may include recording data packet flowing from the peripheral to the CPU and data packet flowing from the CPU to the peripheral, wherein the recorded data packet flowing from the peripheral to the CPU and the data packet flowing from the CPU to the peripheral may be organized according to the type of the data read and write operation.

In a specific embodiment, organizing the recorded data packet flowing from the peripheral to the CPU and the data packet flowing from the CPU to the peripheral according to the type of the data read and write operation may include organizing the recorded data packet flowing from the peripheral to the CPU and the data packet flowing from the CPU to the peripheral in MMIO type, DMA type, P2P type and other types except for the MMIO type, the DMA type and the P2P type, respectively.

In a specific embodiment, the recording data packet flowing from the peripheral to the CPU and the data packet flowing from the CPU to the peripheral may include sequentially recording the data packet flowing from the peripheral to the CPU and the data packet flowing from the CPU to the peripheral in order of time.

In another embodiment, the input and output recording device may be configured separately from the processor 801. For example, the input and output recording device may be configured as a chip connected to the processor 801, and the function of the input and output recording device may be realized by the control of the processor 801.

As illustrated in FIG. 8, the electronic device may further include an input unit 803, a display unit 804, and a power supply 805. It is noted that the electronic device does not need to include all the components shown in FIG. 8. In addition, the electronic device may further include components not shown in FIG. 8, and reference may be made to the related art.

As illustrated in FIG. 8, the processor 801, sometimes referred to as a controller or operation control, may include a microprocessor or other processor device and/or logic device, and the processor 801 receives input and controls the operations of various components of the electronic device.

The memory 802 may be, for example, one or more of a buffer, a flash memory, a hard drive, a removable medium, a volatile memory, a non-volatile memory, or other suitable device that stores one or more of the configuration information of the processor 801 described above, instructions executed by the processor 801, recorded information, and the like. The processor 801 may execute a program stored in the memory 802 to implement information storage or processing and the like. In an embodiment, a buffer memory, that is, a buffer, is further included in the memory 802 to store the intermediate information.

The input unit 803 may be, for example, a key input device or a touch input device for providing input to the processor 801. The display unit 804 is configured to display a display object such as an image or a text. The display unit may be an LCD display, for example, but the disclosure is not limited thereto. The power supply 805 is used to provide power to the electronic device.

The embodiments of the disclosure further provide a computer readable instruction, wherein when the instruction is executed in an electronic device, the program causes the electronic device to execute the input and output recording method as shown in FIG. 5.

The embodiments of the disclosure further provide a storage medium storing computer readable instructions, wherein the computer readable instructions cause the electronic device to execute the input and output recording method as shown in FIG. 5.

The embodiments of the disclosure further provide an electronic device, which may be a desktop computer or the like, which is not limited in the present embodiments. In the present embodiments, the structure of each part of the electronic device is the same as that of the electronic device shown in FIG. 8. Functions that the processor 801 in the electronic device can perform may refer to the implementation of the data read and write method by the central processor shown in FIG. 7 and the implementation of the central processor shown in FIG. 6, which are incorporated herein by reference, and details are not repeatedly described herein.

In an embodiment, the processor 801 may integrate the functions of the aforementioned central processor. For example, the processor 801 may be configured to perform control to: suspend execution of the current instruction stream upon receiving a request sent from the input and output recording device, and send an instruction to the input and output recording device to instruct the input and output recording device to send the data packet of the data read and write operation to be processed; and receiving the data packet of the data read and write operation to be processed sent by the input and output recording device, and completing the data read and write operation to be processed.

In a specific embodiment, the processor 801 may be further configured to perform control to: record the current instruction position and the data read and write operation to be processed, wherein the data read and write operation is a data read and write operation initiated by the peripheral.

In a specific embodiment, the sending an instruction to the input and output recording device to instruct the input and output recording device to send the data packet of the data read and write operation to be processed may include when the data read and write operation to be processed includes a plurality of data read and write operations, instructing the input and output recording device to sequentially send the data packets of the data read and write operations to be processed one by one.

In a specific embodiment, the sending an instruction to the input and output recording device to instruct the input and output recording device to send the data packet of the data read and write operation to be processed may include sending an instruction to the input and output recording device in accordance with processing strategy to instruct the input and output recording device to send the data packet of the selected data read and write operation to be processed.

In a specific embodiment, the data read and write operation to be processed may include DMA and/or P2P types of data read and write operation.

In a specific embodiment, the processor 801 may be further configured to perform control to: resume the execution of the instruction stream after completing the data read and write operation to be processed.

In another embodiment, the central processor may be configured separately from the processor 801. For example, the central processor may be configured as a chip connected to the processor 801, and the functions of the central processor may be implemented by the control of the processor 801.

The embodiments of the disclosure further provide a computer readable instruction, wherein when the instruction is executed in an electronic device, the program causes the electronic device to execute the data read and write operation method of the central processor as shown in FIG. 7.

The embodiments of the disclosure further provide a storage medium storing computer readable instructions, wherein the computer readable instructions cause the electronic device to execute the data read and write operation method of the central processor as shown in FIG. 7.

Those skilled in the art may be aware that the units and algorithm steps of each example described in conjunction with the embodiments disclosed herein may be implemented by electronic hardware, computer software, or a combination of the two. In order to clearly illustrate the interchangeability of hardware and software, in the above description, the components and steps of the examples have been generally described in terms of their functions. Whether these functions are implemented by hardware or software depends on the specific application and design constraints of the technical solutions. A person skilled in the art may use different methods for each particular application to implement the described functions, but such implementation should not be considered as beyond the scope of the present disclosure.

Those skilled in the art may clearly understand that, for the convenience and simplicity of the description, reference may be made to corresponding processes in the foregoing method embodiments for the specific working process of the foregoing system, apparatus and unit, and details are not described herein again.

In the several embodiments provided in the present application, it should be understood that the disclosed system, apparatus, and method may be implemented in other manners. For example, the apparatus embodiments described above are merely exemplary. For example, the unit division is merely logical function division and may be other division in actual implementation. For example, multiple units or components may be combined or may be integrated into another system, or some features may be ignored or not executed. In addition, the mutual coupling or direct coupling or communication connection shown or discussed may be indirect coupling or communication connection through some interfaces, devices or modules, and may also be electrical, mechanical or other forms of connection.

The modules described as separate components may or may not be physically separated. The components displayed as modules may or may not be physical modules, that is, may be located in one place or may also be distributed on multiple network modules. Some or all of the modules may be selected according to actual needs to achieve the objectives of the solutions in the embodiments of the present disclosure.

In addition, each function module in each embodiment of the present disclosure may be integrated into one processing module, or each module exists physically alone, or two or more modules may be integrated into one module. The above-mentioned integrated module can be implemented in the form of hardware or in the form of software functional module.

When the integrated module is implemented in the form of software functional module and is sold or used as an independent product, the integrated module may be stored in a computer readable storage medium. Based on such understanding, the technical solution of the present disclosure essentially, or the part contributing to the prior art, or all or part of the technical solution may be embodied in the form of software product stored on a storage medium including several instructions for enabling a computer device (which may be a personal computer, a server, a network device, or the like) to execute all or part of the steps of the method according to each embodiment of the present disclosure. The foregoing storage medium includes various media capable of storing program code such as a USB disk, a removable hard disk, a read-only memory (ROM), a random access memory (RAM), a magnetic disk, or an optical disk.

The present disclosure is described with reference to flowcharts and/or block diagrams of a method, an apparatus (system), and a computer program product according to an embodiment of the disclosure. It will be understood that each flow and/or block in the flowcharts and/or block diagrams, and combinations of the flows and/or blocks in the flowcharts and/or the block diagrams, may be implemented by computer program instructions. These computer program instructions may be provided to a processor of a general purpose computer, special purpose computer, embedded processor, or other programmable data processing apparatus to produce a machine such that the instructions, which are executed via the processor of the computer or other programmable data processing apparatus, produce means for implementing the functions specified in one or more flows in the flowcharts and/or one or more blocks in the block diagrams.

These computer program instructions may also be stored in a computer readable memory that can direct a computer or other programmable data processing apparatus to function in a particular manner such that the instructions stored in the computer readable memory produce an article of manufacture including instruction means that implements the functions specified in one or more flows in the flowcharts and/or one or more blocks in the block diagrams.

These computer program instructions may also be loaded onto a computer or other programmable data processing apparatus to cause a series of operating steps to be performed on the computer or other programmable apparatus to produce computer-implemented processes, such that the instructions which execute on the computer or other programmable apparatus provide the steps for implementing the functions specified in one or more flows in the flowcharts and/or one or more blocks in the block diagrams.

The objectives, technical solutions and beneficial effects of the present disclosure are further described in detail with reference to the specific embodiments described above. It should be understood that the foregoing descriptions are merely specific embodiments of the present disclosure, but are not intended to limit the protection scope of the present disclosure. Any modifications, equivalent substitutions, improvements, and the like made within the spirit and principle of the present disclosure should be included within the protection scope of the present disclosure.

What is claimed is:

1. An input and output recording device, wherein
   the input and output recording device is provided between a central processor CPU and a peripheral, and is configured to record data read and write operations between the CPU and the peripheral, the data read and write operations comprise a data read and write operation initiated by the peripheral and a data read and write operation initiated by the CPU;
   wherein the input and output recording device is further configured to request the CPU to process the data read and write operation initiated by the peripheral, and upon receiving an instruction sent by the CPU, send a data packet of the data read and write operation initiated by the peripheral to the CPU,
   wherein the input and output recording device is further configured to request the CPU to process the data read and write operation initiated by the peripheral when the data packet of the data read and write operation initiated by the peripheral stored in the input and output recording device reaches a preset threshold.

2. The input and output recording device of claim 1, wherein the input and output recording device is further configured to request the CPU to process the data read and write operation initiated by the peripheral using an interrupt mode.

3. The input and output recording device of claim 1, wherein the input and output recording device is further configured to obtain an identification of the peripheral and determine whether to record the data read and write operation between the CPU and the peripheral according to the identification of the peripheral.

4. The input and output recording device of claim 1, wherein the input and output recording device is further configured to obtain a transaction identification of the data packet of the data read and write operation between the CPU and the peripheral, and determine whether the data read and write operation between the CPU and the peripheral is the data read and write operation initiated by the peripheral according to the transaction identification.

5. The input and output recording device of claim 1, wherein the input and output recording device comprises:
   a first partition configured to record a data packet flowing from the peripheral to the CPU; and
   a second partition configured to record a data packet flowing from the CPU to the peripheral.

6. The input and output recording device of claim 1, wherein the input and output recording device comprises:
   a trace buffer configured to record the data read and write operation between the CPU and the peripheral, the data read and write operation comprises the data read and write operation initiated by the peripheral and the data read and write operation initiated by the CPU; and
   a pause buffer configured to request the CPU to process the data read and write operation initiated by the peripheral, and upon receiving the instruction sent by the CPU, send the buffered data packet of the data read and write operation initiated by the peripheral to the CPU through the trace buffer.

7. The input and output recording device of claim 5, wherein:
   the first partition is further configured to organize the recorded data packet flowing from the peripheral to the CPU according to the type of the data read and write operation; and
   the second partition is further configured to organize the recorded data packet flowing from the CPU to the peripheral according to the type of the data read and write operation.

8. The input and output recording device of claim 7, wherein the first partition comprises:
   a first sub-region for recording the data packet flowing from the peripheral to the CPU of Memory mapped I/O (MMIO) type;

a second sub-region for recording the data packet flowing from the peripheral to the CPU of Direct Memory Access (DMA) type;

a third sub-region for recording the data packet flowing from the peripheral to the CPU of Peer to Peer (P2P) type; and a fourth sub-region for recording other type of the data packet flowing from the peripheral to the CPU except for the MMIO type, the DMA type and the P2P type; and wherein the second partition comprises:

a fifth sub-region for recording the data packet flowing from the CPU to the peripheral of MMIO type;

a sixth sub-region for recording the data packet flowing from the CPU to the peripheral of DMA type;

a seventh sub-region for recording the data packet flowing from the CPU to the peripheral of P2P type; and an eighth sub-region for recording other type of the data packet flowing from the CPU to the peripheral except for the MMIO type, the DMA type and the P2P type.

9. An input and output recording method, comprising:

recording data read and write operations between a central processor CPU and a peripheral, the data read and write operations comprising a data read and write operation initiated by the peripheral and a data read and write operation initiated by the CPU; and requesting the CPU to process the data read and write operation initiated by the peripheral, and upon receiving an instruction sent by the CPU, send a data packet of the data read and write operation initiated by the peripheral to the CPU, wherein the requesting the CPU to process the data read and write operation initiated by the peripheral comprises:

requesting the CPU to process the data read and write operation initiated by the peripheral when the data packet of the stored data read and write operation initiated by the peripheral reaches a preset threshold.

10. The input and output recording method of claim 9, wherein the requesting the CPU to process the data read and write operation initiated by the peripheral comprises:

requesting the CPU to process the data read and write operation initiated by the peripheral using an interrupt mode.

11. The input and output recording method of claim 9, further comprising:

obtaining an identification of the peripheral; and determining whether to record the data read and write operation between the CPU and the peripheral according to the identification of the peripheral.

12. The input and output recording method of claim Original 9, further comprising:

obtaining a transaction identification of the data packet of the data read and write operation between the CPU and the peripheral; and determining whether the data read and write operation between the CPU and the peripheral is the data read and write operation initiated by the peripheral according to the transaction identification.

\* \* \* \* \*